US011919546B2

(12) United States Patent
Zhao et al.

(10) Patent No.: US 11,919,546 B2
(45) Date of Patent: Mar. 5, 2024

(54) SYSTEMS AND METHODS FOR ESTIMATING CUBOIDS FROM LIDAR, MAP AND IMAGE DATA

(71) Applicant: FORD GLOBAL TECHNOLOGIES, LLC, Dearborn, MI (US)

(72) Inventors: Wulue Zhao, Ann Arbor, MI (US); Kevin L. Wyffels, Livonia, MI (US); G. Peter K. Carr, Allison Park, PA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 18/176,852

(22) Filed: Mar. 1, 2023

(65) Prior Publication Data
US 2023/0219602 A1 Jul. 13, 2023

Related U.S. Application Data

(63) Continuation of application No. 16/914,905, filed on Jun. 29, 2020, now Pat. No. 11,628,856.

(51) Int. Cl.
*B60W 60/00* (2020.01)
*G06F 17/16* (2006.01)
*G06F 18/2415* (2023.01)
*G06T 19/00* (2011.01)
*G06V 20/56* (2022.01)
*G06V 20/58* (2022.01)

(52) U.S. Cl.
CPC .... *B60W 60/00272* (2020.02); *B60W 60/001* (2020.02); *G06F 17/16* (2013.01); *G06F 18/24155* (2023.01); *G06T 19/00* (2013.01); *G06V 20/58* (2022.01); *G06V 20/588* (2022.01); *B60W 2420/52* (2013.01); *G06T 2207/10028* (2013.01); *G06T 2210/12* (2013.01)

(58) Field of Classification Search
CPC ............ B60W 60/001; B60W 2420/52; G06V 20/588; G06F 17/16; G06K 9/6278; G06T 19/00; G06T 2207/10028; G06T 2210/12
See application file for complete search history.

(56) References Cited

U.S. PATENT DOCUMENTS

| | | | | |
|---|---|---|---|---|
| 2019/0147245 | A1* | 5/2019 | Qi | ........................... G06V 10/82 |
| | | | | 382/103 |
| 2020/0005485 | A1* | 1/2020 | Xu | ........................ G06V 20/56 |

FOREIGN PATENT DOCUMENTS

| | | | | |
|---|---|---|---|---|
| EP | 2338029 | A1 * | 6/2011 | ........... G01S 17/023 |

* cited by examiner

*Primary Examiner* — Xin Sheng
(74) *Attorney, Agent, or Firm* — Frank MacKenzie; Brooks Kushman P.C.

(57) ABSTRACT

Systems and methods for operating a robotic system. The methods comprise: inferring, by a computing device, a first heading distribution for the object from a 3D point cloud; obtaining, by the computing device, a second heading distribution from a vector map; obtaining, by the computing device, a posterior distribution of a heading using the first and second heading distributions; defining, by the computing device, a cuboid on a 3D graph using the posterior distribution; and using the cuboid to facilitate driving-related operations of a robotic system.

20 Claims, 17 Drawing Sheets

SYSTEMS AND METHODS FOR ESTIMATING CUBOIDS FROM LIDAR, MAP AND IMAGE DATA

CROSS-REFERENCE TO RELATED APPLICATIONS

The present application is a Continuation Applications claiming priority to and the benefit of U.S. patent application Ser. No. 16/914,905 which was filed on Jun. 29, 2020. The content of this U.S. Patent Applications is incorporated herein by reference in its entirety.

BACKGROUND

Statement of the Technical Field

The present disclosure relates generally to autonomous vehicles. More particularly, the present disclosure relates to implementing systems and methods for estimating cuboids from LiDAR, map and image data.

Description of the Related Art

Modern day vehicles have at least one on-board computer and have internet/satellite connectivity. The software running on these on-board computers monitor and/or control operations of the vehicles. The vehicle also comprises LiDAR detectors for detecting objects in proximity thereto. The LiDAR detectors generate LiDAR datasets that measure the distance from the vehicle to an object at a plurality of different times. These distance measurements can be used for tracking movements of the object, making predictions as to the objects trajectory, and planning paths of travel for the vehicle based on the predicted objects trajectory.

SUMMARY

The present disclosure concerns implementing systems and methods for operating an autonomous vehicle. The methods comprise: obtaining, by a computing device, a LiDAR dataset; plotting, by a computing device, the LiDAR dataset on a 3D graph to define a 3D point cloud; using, by a computing device, the LiDAR dataset and contents of a vector map to define a cuboid on the 3D graph that encompasses points of the 3D point cloud that are associated with an object in proximity to the vehicle, where the vector map comprises lane information; and using the cuboid to facilitate driving-related operations of the autonomous vehicle.

In some scenarios, the cuboid is defined on the 3D graph by inferring a heading distribution $P_{pt}(\theta)$ for the object from the 3D point cloud. The heading distribution $P_{pt}(\theta)$ is defined by mathematical equation $P_{pt}(\theta)=1/\eta * \exp(-C(\theta))$, where exp( ) is the exponential function, $\eta$ is a normalization constant, and $C(\theta)$ is a cost function. The cost function $C(\theta)$ is defined by mathematical equation $$C(\theta) = \sum_{elevation} (\text{Area}(B(\theta) + \text{UnmatchedArea}(\theta) + d(\theta) * d(\theta)),$$

where $B(\theta)$ is a minimal bounding box, $\text{Area}(B(\theta))$ is an area of the minimal bounding box, $\theta$ is a heading direction or yaw in a frame, $\text{UnmatchedArea}(\theta)$ is an area of the minimal bounding box that does not have any LiDAR points, and $d(\theta)$ is a distance between an edge of a bounding box at a current elevation to a most outer edge.

In those or other scenarios, the cuboid is defined on the 3D graph by determining a heading distribution $P_m(\theta)$ from the vector map. The heading distribution $P_m(\theta)$ is defined by mathematical equation $P_m(\theta)=\max_i(N(\theta: \alpha_i, \sigma_i^2)$, where $N( )$ is a normal distribution, $\alpha_i$ are the lane directions, and $\sigma_i^2$ are the corresponding variances which are configurable.

The cuboid is defined on the 3D graph by further performing filter operations to obtain a posterior distribution of a heading using the heading distributions $P_{pt}(\theta)$ and/or $P_m(\theta)$. The filter operations may comprise Bayes filter operations. A peak heading is selected from the posterior distribution of the heading. In some scenarios, the posterior distribution has more than one peak heading. When this occurs, a peak heading can be selected from a plurality of peak headings contained in the posterior distribution that is aligned with a visual heading of the object. The cuboid is defined on the 3D graph by further fitting a bounding box to the 3D point cloud that is orientated to the peak heading.

In those or other scenarios, the cuboid is defined on the 3D graph by further: determining whether the peak heading and a velocity of the object are within ninety degrees of each other; and flipping the peak heading by one hundred eighty degrees when a determination is made that the peak heading and velocity are within ninety degrees of each other.

BRIEF DESCRIPTION OF THE DRAWINGS

The present solution will be described with reference to the following drawing figures, in which like numerals represent like items throughout the figures.

DETAILED DESCRIPTION

Figure 1:
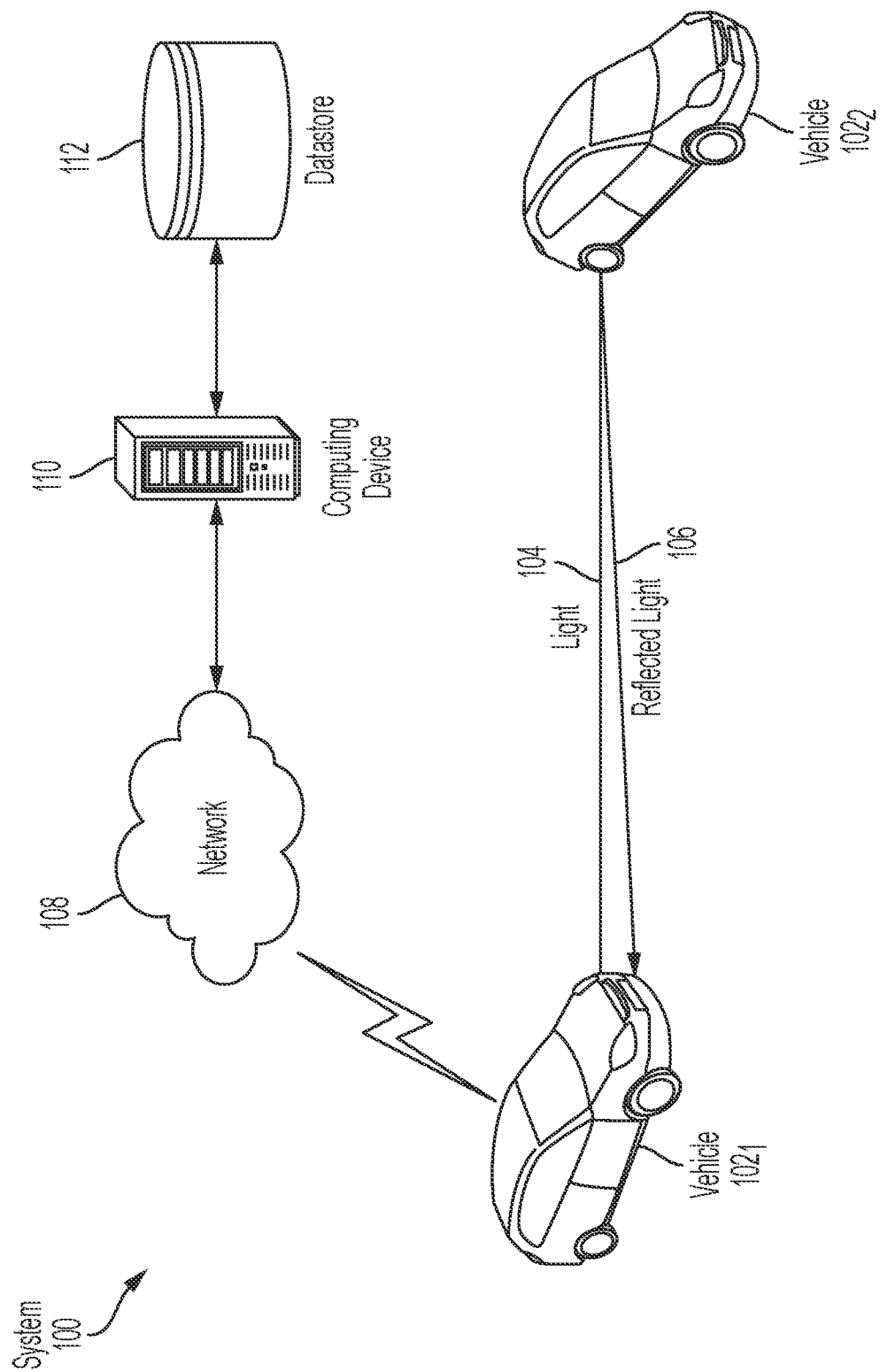
FIG. 1 is an illustration of an illustrative system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Real-time prediction of actions by drivers of other vehicles and pedestrians is a challenge for on-road semi-autonomous or autonomous vehicle applications. Such real-time prediction is particularly challenging when the drivers and/or pedestrians break traffic rules. Systematically assuming the worst case action from the drivers and/or pedestrians will paralyze the self-driving vehicle, but erroneously optimistic predictions can result in unsafe autonomous vehicle behavior.

This document describes methods and systems that are directed to addressing the problems described above and/or other issues. Accordingly, the present solution concerns systems and methods for controlling vehicles using a cuboid based algorithm. A cuboid for a moving object (e.g., a vehicle) is a 3D oriented bounding box that represents (i) a heading of the object, and (ii) a full extent of the object. Point clouds sampled by a LiDAR sensor of an Autonomous Vehicle ("AV") only sample part of the object's surface due to self and inter object occlusion or limited Field of View ("FOV"). The problem is how to build a cuboid from the incomplete LiDAR data samples. Besides the LiDAR point samples for the object, vector map(s) and/or heading detections from images are available which provide additional information for cuboid estimation.

Existing approaches can be divided into two categories: a probabilistic estimation category; and a machine learning category. The existing approaches in the probabilistic estimation category usually make some assumptions that do not hold true in some AV applications. Many of the machine learning approaches do not produce tight cuboids. In addition, machine learning approaches suffer from the typical issues with insufficient or unbalanced training data.

The present solution addresses the issues of the existing approaches. The present solution falls into the probabilistic estimation category. The present solution generally involves: estimating a heading distribution by fusing data from LiDAR data, a vector map and a visual heading; and constructing a cuboid along the heading with a highest likelihood. It may be difficult to distinguish a front of an object (e.g., a vehicle) from a back of the object by simply analyzing LiDAR data since the front and back of the object may have inherent similarities (even in dense point cloud scenarios). Thus, the LiDAR data may not provide sufficient information for making a heading estimation for the object. However, the lane directions available in the vector map provide a strong indication of a heading for a well-behaved object. Thus, the lane information contained in a vector map is used as a prior for a heading estimation. The heading estimation can be obtained from the vector map even when a few point samples are available.

The present solution constructs a cuboid of a typical object size even when a partial sample of the object is observed. The cuboid fits tightly around the LiDAR points associated with the object when a full sample of the object is observed. In either case, the edges of the cuboid match part of the convex hulls of the sample points. This makes sense because the LiDAR points are sample from the surface of the object.

The present solution uses histogram filtering, a non-parametric inference approach, which makes the present solution highly adaptable and extensible. As discussed below, the present solution begins with a basic frame work implementing a cost function that roughly matches what is to be achieved. More components are added to the cost function to account for different features presented in the point clouds that are useful in determining a heading estimation. These component may be added to the cost function without any change to the framework. This allows one to fine-tune or experiment with different cost functions.

Notably, the present solution is being described herein in the context of an autonomous vehicle. The present solution is not limited to autonomous vehicle applications. The present solution can be used in other applications such as robotic application, radar system application, metric applications, and/or system performance applications Illustrative Systems Referring now to FIG. 1, there is provided an illustration of an illustrative system 100. System 100 comprises a vehicle $102_1$ that is traveling along a road in a semi-autonomous or autonomous manner. Vehicle $102_1$ is also referred to herein as an AV. The AV $102_1$ can include, but is not limited to, a land vehicle (as shown in FIG. 1), an aircraft, or a watercraft.

AV $102_1$ is generally configured to detect objects in proximity thereto. The objects can include, but are not limited to, a vehicle $102_2$, cyclist (not shown) (such as a rider of a bicycle, electric scooter, motorcycle, or the like) and/or a pedestrian (not shown). When such a detection is made, AV $102_1$ performs operations to: generate one or more possible object trajectories for the detected object; analyze the generated possible object trajectory(ies) to determine a trajectory for the AV $102_1$; and cause the AV $102_1$ to follow the trajectory.

Such object detections are facilitated using LiDAR datasets generated by an onboard LiDAR detector. The LiDAR detector generally measures the distance to an object $102_2$ by illuminating the object $102_2$ with light 104 (e.g., a laser light) and measuring the reflected light 106 with an onboard sensor. The LiDAR detector generates a LiDAR dataset at a plurality of times t, t+1, t+2, . . . , t+n. The LiDAR datasets are processed by an onboard computing device of the AV $102_1$ and/or by a remote computing device 110 to obtain one or more predicted trajectories for the object given the LiDAR datasets. In this regard, the LiDAR datasets may be communicated from the AV $102_1$ to the remote computing device 110 over a network 108 (e.g., the Internet) via wired and/or wireless connections. The LiDAR datasets may also be stored in a memory of the AV $102_1$, which may be manually removed from the AV $102_1$ and connected to the remote computing device 110. The LiDAR datasets may additionally be stored in a remote datastore 112 (e.g., a database). The one or more predicted trajectories for the object are then used to generate a trajectory for the AV $102_1$.

Figure 2:
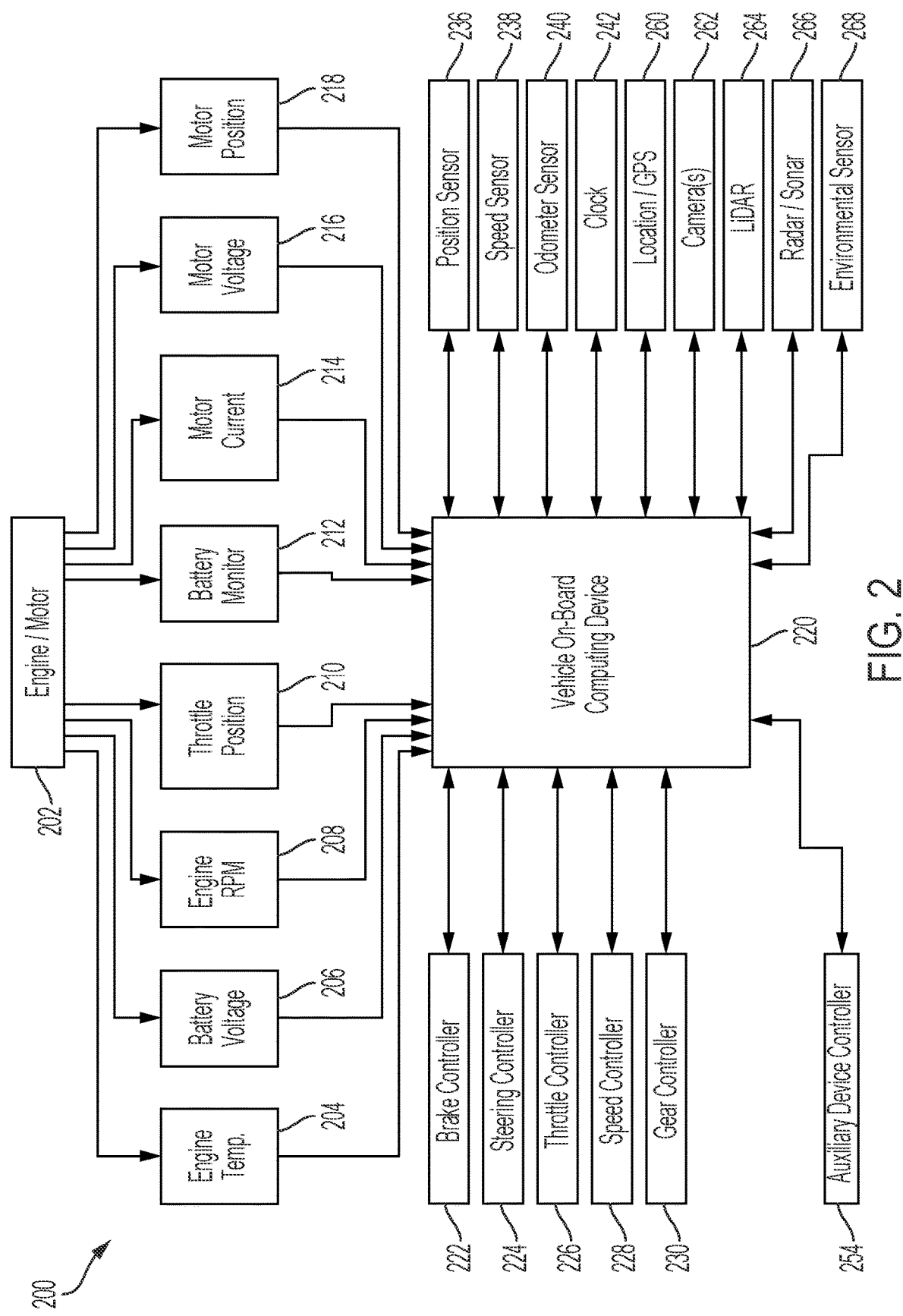
FIG. 2 is an illustration of an illustrative architecture for a vehicle.

Referring now to FIG. 2, there is provided an illustration of an illustrative system architecture 200 for a vehicle. Vehicles $102_1$ and/or $102_2$ of FIG. 1 can have the same or similar system architecture as that shown in FIG. 2. Thus, the following discussion of system architecture 200 is sufficient for understanding vehicle(s) $102_1$, $102_2$ of FIG. 1.

As shown in FIG. 2, the vehicle 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 260 (e.g., a Global Positioning System ("GPS") device); object detection sensors such as one or more cameras 262; a LiDAR sensor system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to an on-board computing device 220. The on-board computing device 220 analyzes the data captured by the sensors and optionally controls operations of the vehicle based on results of the analysis. For example, the on-board computing device 220 may control: braking via a brake controller 232; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as LiDAR 264 is communicated from those sensors to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

When the on-board computing device 220 detects a moving object, the on-board computing device 220 will generate one or more possible object trajectories for the detected object, and use the possible object trajectories to determine a vehicle trajectory for the AV. The on-board computing device 220 then performs operations to cause the AV to follow the defined vehicle trajectory. For example, the on-board computing device 220 uses the object trajectory information to decide what space has been occupied by the object, and then generates a vehicle trajectory in which the AV is not planned to travel to that space.

Figure 3:
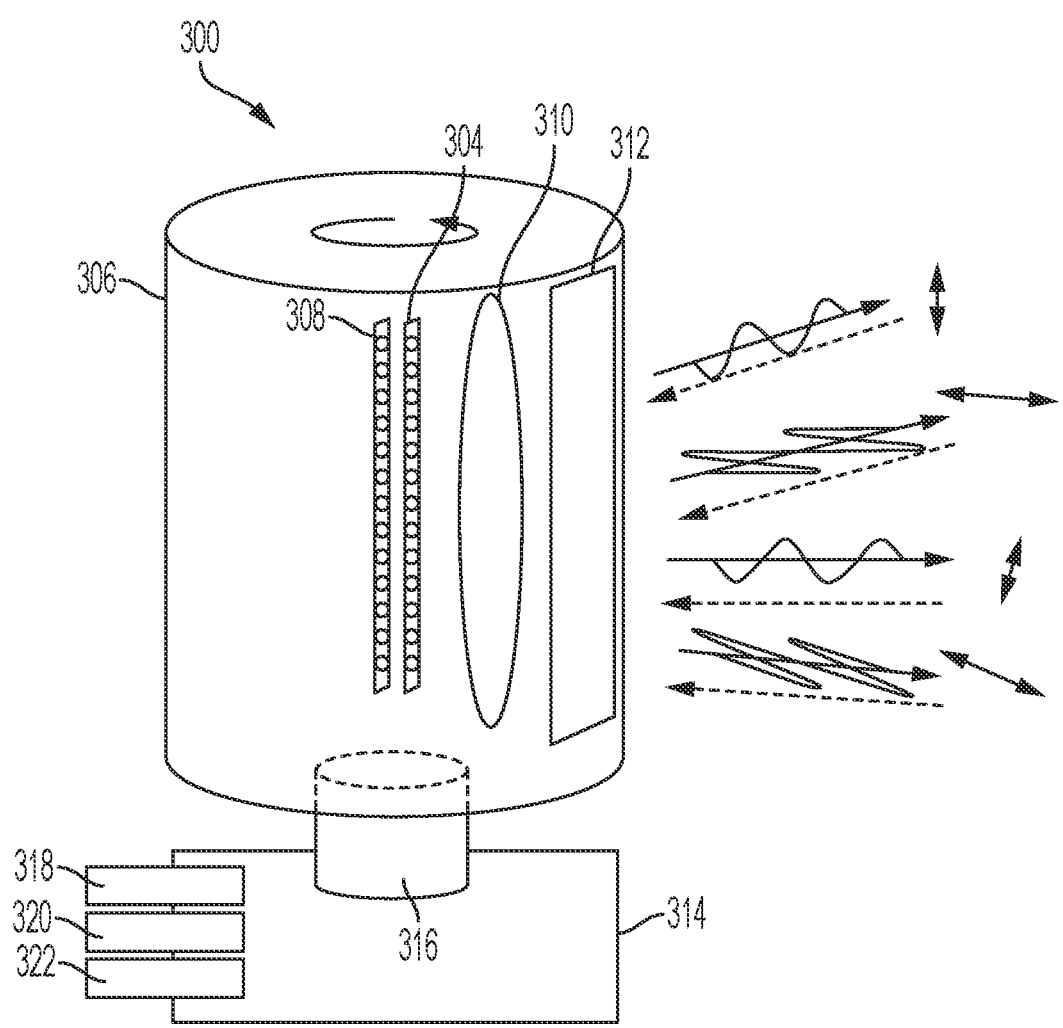
FIG. 3 is an illustration of an illustrative architecture for a LiDAR system employed by the vehicle shown in FIG. 2.

Referring now to FIG. 3, there is provided an illustration of an illustrative LiDAR system 300. LiDAR system 264 of FIG. 2 may be the same as or substantially similar to the LiDAR system 300. As such, the discussion of LiDAR system 300 is sufficient for understanding LiDAR system 264 of FIG. 2.

As shown in FIG. 3, the LiDAR system 300 includes a housing 306 which may be rotatable 360° about a central axis such as hub or axle 316. The housing may include an emitter/receiver aperture 312 made of a material transparent to light. Although a single aperture is shown in FIG. 2, the present solution is not limited in this regard. In other scenarios, multiple apertures for emitting and/or receiving light may be provided. Either way, the LiDAR system 300 can emit light through one or more of the aperture(s) 312 and receive reflected light back toward one or more of the aperture(s) 211 as the housing 306 rotates around the internal components. In an alternative scenarios, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The emitter system 304 may include any number of individual emitters (e.g., 8 emitters, 64 emitters, or 128 emitters). The emitters may emit light of substantially the same intensity or of varying intensities. The individual beams emitted by the light emitter system 304 will have a well-defined state of polarization that is not the same across the entire array. As an example, some beams may have vertical polarization and other beams may have horizontal polarization. The LiDAR system will also include a light detector 308 containing a photodetector or array of photodetectors positioned and configured to receive light reflected back into the system. The emitter system 304 and light detector 308 would rotate with the rotating shell, or they would rotate inside the stationary dome of the housing 306. One or more optical element structures 310 may be positioned in front of the light emitting unit 304 and/or the light detector 308 to serve as one or more lenses or wave plates that focus and direct light that is passed through the optical element structure 310.

One or more optical element structures 310 may be positioned in front of a mirror 312 to focus and direct light that is passed through the optical element structure 310. As shown below, the system includes an optical element structure 310 positioned in front of the mirror 312 and connected to the rotating elements of the system so that the optical element structure 310 rotates with the mirror 312. Alternatively or in addition, the optical element structure 310 may include multiple such structures (for example lenses and/or wave plates). Optionally, multiple optical element structures 310 may be arranged in an array on or integral with the shell portion of the housing 306.

Optionally, each optical element structure 310 may include a beam splitter that separates light that the system receives from light that the system generates. The beam splitter may include, for example, a quarter-wave or half-wave wave plate to perform the separation and ensure that received light is directed to the receiver unit rather than to the emitter system (which could occur without such a wave plate as the emitted light and received light should exhibit the same or similar polarizations).

The LiDAR system will include a power unit 318 to power the light emitting unit 304, a motor 316, and electronic components. The LiDAR system will also include an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the LiDAR system 300 as shown, or some or all of it may be external to the LiDAR system and communicatively connected to the LiDAR system via a wired or wireless communication network or link.

Figure 4:
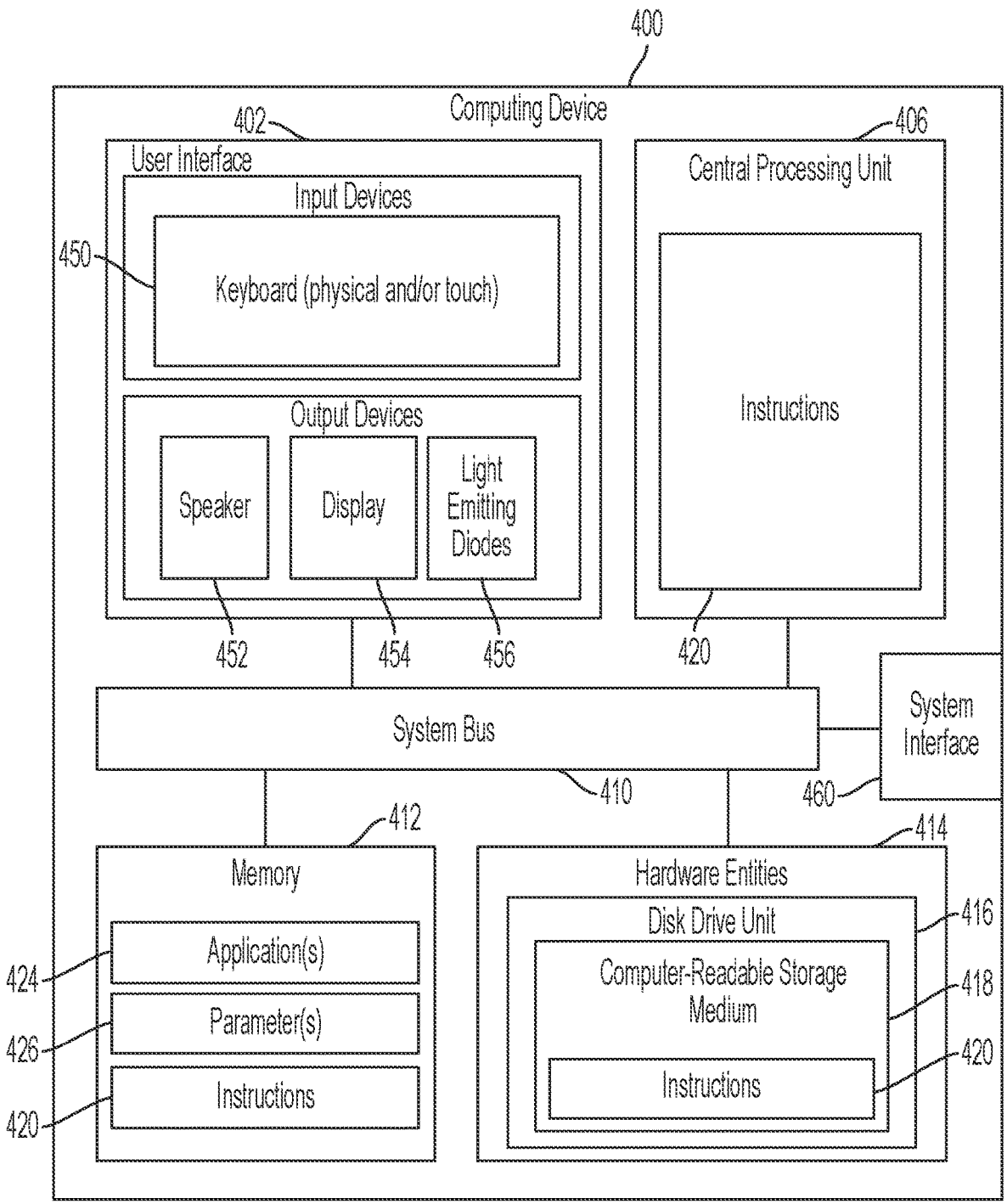
FIG. 4 is an illustration of an illustrative computing device.

Referring now to FIG. 4, there is provided an illustration of an illustrative architecture for a computing device 400. The computing device 110 of FIG. 1 and/or the vehicle on-board computing device 220 of FIG. 2 is/are the same as or similar to computing device 300. As such, the discussion of computing device 300 is sufficient for understanding the computing device 110 of FIG. 1 and the vehicle on-board computing device 220 of FIG. 2.

Computing device 400 may include more or less components than those shown in FIG. 4. However, the components shown are sufficient to disclose an illustrative solution implementing the present solution. The hardware architecture of FIG. 4 represents one implementation of a representative computing device configured to operate a vehicle, as described herein. As such, the computing device 400 of FIG. 4 implements at least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit ("CPU") 406, a system bus 410, a memory 412 connected to and accessible by other portions of computing device 400 through system bus 410, a system interface 460, and hardware entities 414 connected to system bus 410. The user interface can include input devices and output devices, which facilitate user-software interactions for controlling operations of the computing device 400. The input devices include, but are not limited to, a physical and/or touch keyboard 450. The input devices can be connected to the computing device 400 via a wired or wireless connection (e.g., a Bluetooth® connection). The output devices include, but are not limited to, a speaker 452, a display 454, and/or light emitting diodes 456. System interface 460 is configured to facilitate wired or wireless communications to and from external devices (e.g., network nodes such as access points, etc.).

At least some of the hardware entities 414 perform actions involving access to and use of memory 412, which can be a Random Access Memory ("RAM"), a disk drive, flash memory, a Compact Disc Read Only Memory ("CD-ROM") and/or another hardware device that is capable of storing instructions and data. Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Figure 5:
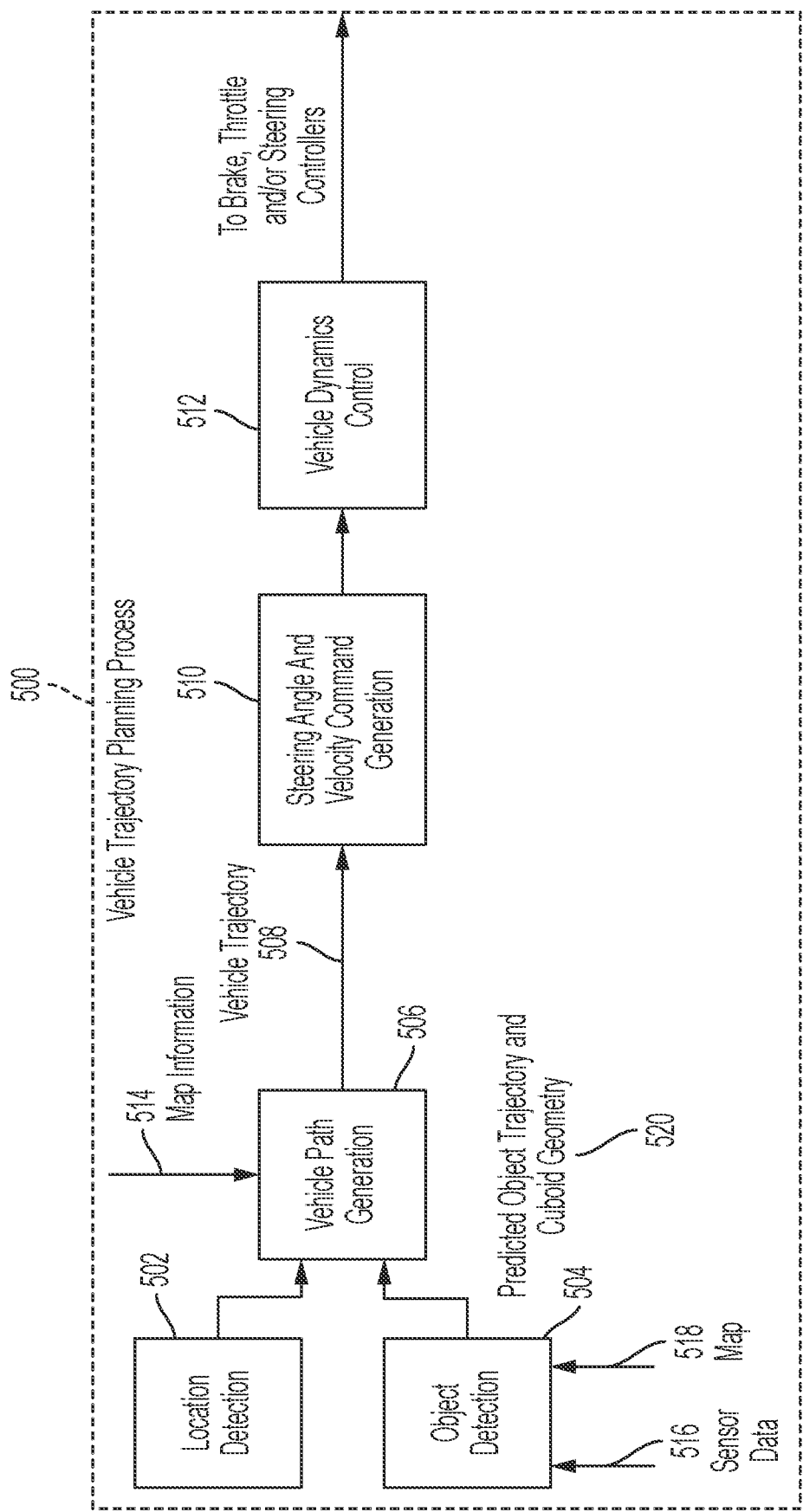
FIG. 5 provides a block diagram of an illustrative vehicle trajectory planning process.

Referring now to FIG. 5, there is provided a block diagram that is useful for understanding how movement of an AV is achieved in accordance with the present solution. All of the operations performed in blocks 502-512 can be performed by the on-board computing device of a vehicle (e.g., AV 102$_1$ of FIG. 1).

In block 502, a location of the AV (e.g., AV 102$_1$ of FIG. 1) is detected. This detection can be made based on sensor data output from a location sensor (e.g., location sensor 260 of FIG. 2) of the AV. This sensor data can include, but is not limited to, GPS data. The detected location of the AV is then passed to block 506.

In block 504, an object (e.g., vehicle 102$_2$ of FIG. 1) is detected within proximity of the AV (e.g., <100+ meters). This detection is made based on sensor data output from a camera (e.g., camera 262 of FIG. 2) of the AV and/or a LiDAR system (e.g., LiDAR system 264 of FIG. 2) of the AV. For example, image processing is performed to detect an instance of an object of a certain class (e.g., a vehicle or pedestrian) in an image. The image processing/object detection can be achieved in accordance with any known or to be known image processing/object detection algorithm.

Additionally, a predicted trajectory is determined in block 504 for the object. The object's trajectory is predicted in block 504 based on the object's class, a cuboid geometry and/or contents of a map 518 (e.g., sidewalk locations, lane locations, lane directions of travel, driving rules, etc.). The manner in which the cuboid geometry is determined will become evident as the discussion progresses. At this time it should be noted that the cuboid geometry is determined using the LiDAR dataset and the map 518. Techniques for predicting object trajectories based on cuboid geometries are well known in the art. Any known or to be known technique for predicting object trajectories based on cuboid geometries can be used herein without limitation. For example, one technique involves predicting that the object is moving on a linear path in the same direction as the heading direction of the cuboid. The predicted object trajectories can include, but are not limited to, the following trajectories:

a trajectory defined by the object's actual speed (e.g., 1 mile per hour) and actual direction of travel (e.g., west);
  a trajectory defined by the object's actual speed (e.g., 1 mile per hour) and another possible direction of travel (e.g., south, south-west, or X (e.g., 40°) degrees from the object's actual direction of travel in a direction towards the AV) for the object;
  a trajectory defined by another possible speed for the object (e.g., 2-10 miles per hour) and the object's actual direction of travel (e.g., west); and/or
  a trajectory defined by another possible speed for the object (e.g., 2-10 miles per hour) and another possible direction of travel (e.g., south, south-west, or X (e.g., 40°) degrees from the object's actual direction of travel in a direction towards the AV) for the object.

The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 520 specifying the object's predicted trajectory and the cuboid geometry is provided to block 506. In some scenarios, a classification of the object is also passed to block 506. In block 506, a vehicle trajectory is generated using the information from blocks 502 and 504. Techniques for determining a vehicle trajectory using a cuboid are well known in the art. Any known or to be known technique for determining a vehicle trajectory using a cuboid can be used herein without limitation. For example, in some scenarios, such a technique involves determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 520 can be determined based on the location information from block 502, the object detection information from block 504, and/or map information 514 (which is pre-stored in a data store of the vehicle). The vehicle trajectory 520 may represent a smooth path that does not have abrupt changes that would otherwise provide passenger discomfort. For example, the vehicle trajectory is defined by a path of travel along a given lane of a road in which the object is not predicted travel within a given amount of time. The vehicle trajectory 520 is then provided to block 508.

In block 508, a steering angle and velocity command is generated based on the vehicle trajectory 520. The steering angle and velocity command is provided to block 510 for vehicle dynamics control, i.e., the steering angle and velocity command causes the AV to follow the vehicle trajectory 508.

Illustrative Methods

Figure 6:
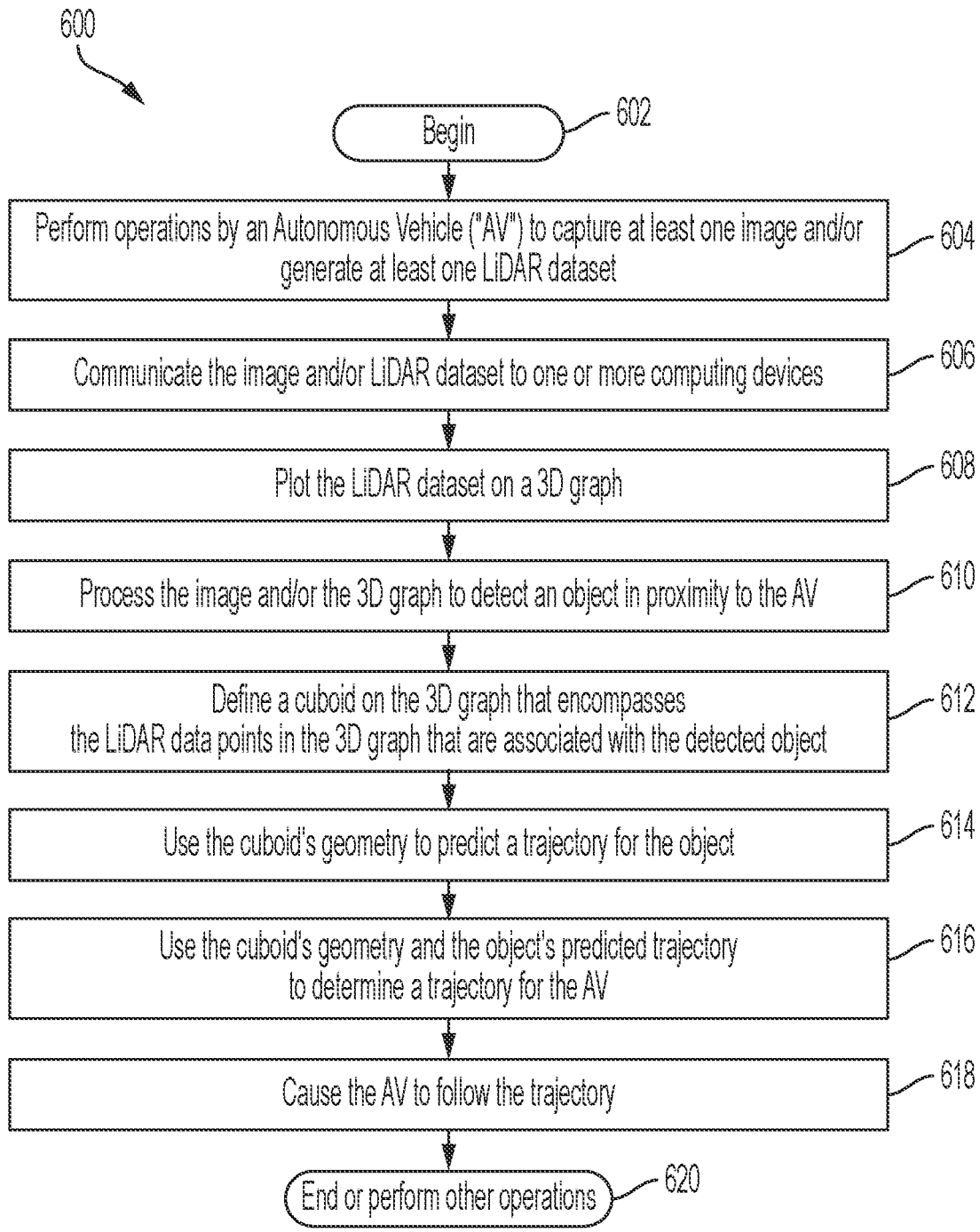
FIG. 6 provides a flow diagram of an illustrative method for operating a vehicle.

Referring now to FIG. 6, there is provided a flow diagram of an illustrative method 600 for operating a vehicle. Method 600 begins with 602 and continues with 604 where an AV (e.g., AV 102$_1$ of FIG. 1) performs operations to capture at least one image and/or generate at least one LiDAR dataset. The image and/or LiDAR dataset are communicated in 606 to one or more computing devices (e.g., computing device 110 of FIG. 1 and/or on-board computing device 220 of FIG. 2).

At the computing device(s), the LiDAR dataset is plotted on a 3D graph as shown by 608. The 3D graph has an x-axis, a y-axis and a z-axis. An illustration of a LiDAR dataset 702 plotted on a graph 700 is provided in FIG. 7. Notably, graph 700 only shows the 2D point of view from the x-axis and the y-axis for ease of illustration. Technique for plotting LiDAR datasets on 3D graphs are well known in the art, and therefore will not be described here. Any known or to be known technique for plotting LiDAR datasets on 3D graphs can be used here.

Figure 7:
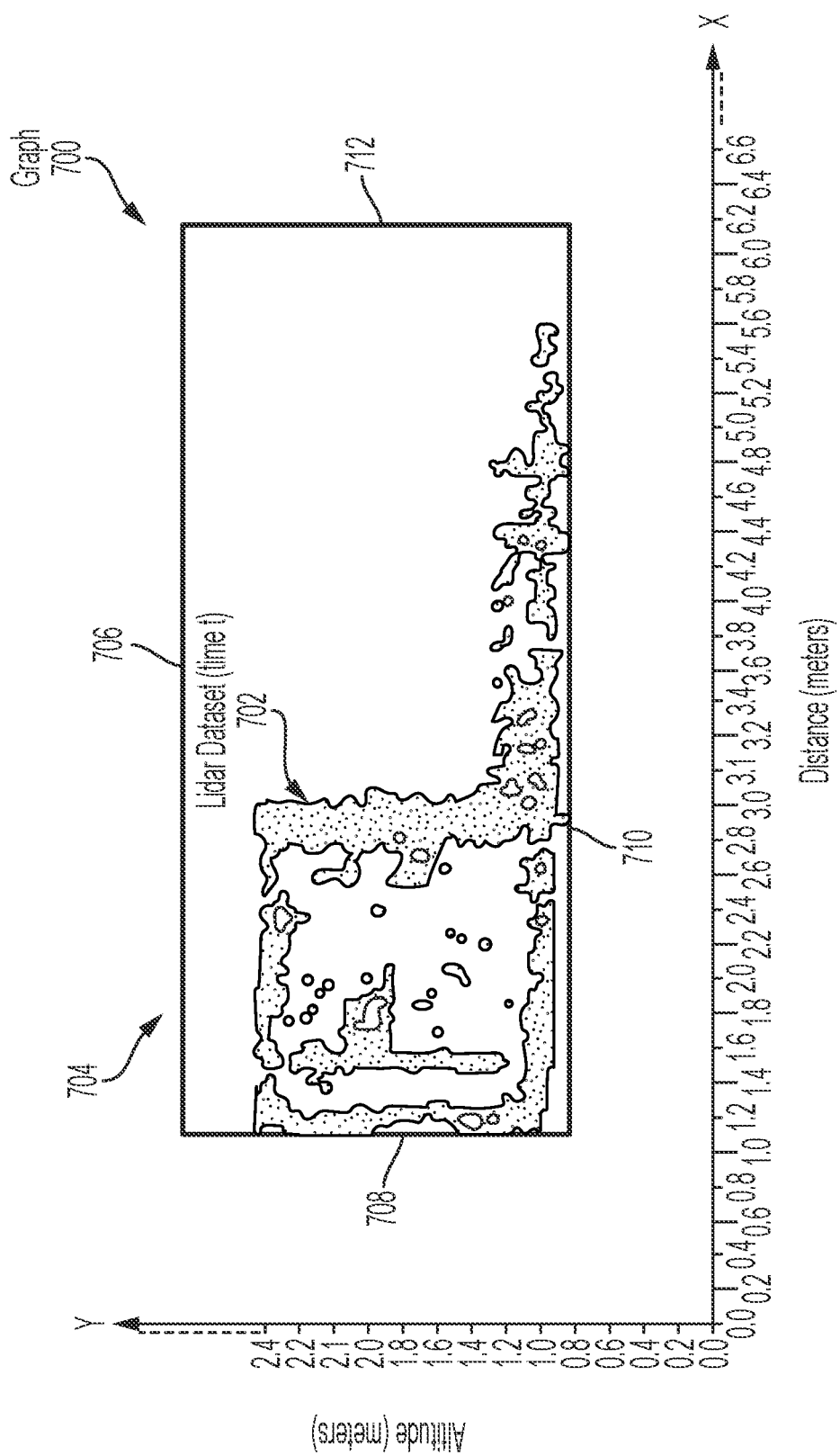
FIG. 7 provides a graph including a LiDAR dataset and a cuboid.

The image and/or 3D graph are used in 610 to detect an object that is located in proximity to the AV. A cuboid is defined in 612 on the 3D graph. The cuboid is a 3D oriented bounded box that represents (i) a heading of the object (e.g., object 102$_2$ of FIG. 1) and (ii) the full extent of the object (e.g., object 102$_2$ of FIG. 1). In this regard, the cuboid encompasses the LiDAR data points in the 3D graph that are associated with the detected object. An illustration showing an illustrative cuboid 704 defined on a graph 700 is provided in FIG. 7. As shown in FIG. 7, all of the data points of a LiDAR dataset 702 reside within the cuboid 704. Notably, one or more of the edges 706-712 of the cuboid may touch or otherwise are in contact with the data points of the LiDAR dataset 702. The present solution is not limited to the particulars of this illustration. Generally, the cuboid is constructed by: fusing the LiDAR dataset, a vector map and a visual heading; and defining a cuboid along the heading with a highest likelihood. The vector map contains the lane direction which provides a strong indication for a heading of the cuboid. The visual heading is estimated for the object from the camera images. The manner in which the cuboid is defined on the 3D graph will become more apparent as the discussion progresses.

Next in 614-616, the cuboid is used to facilitate driving-related operations of the AV (e.g., object tracking, object trajectory prediction, and/or AV trajectory determination). More specifically in 614, the cuboid's geometry is used to predict a trajectory for the object. Techniques for predicting object trajectories based on cuboid geometries are well known in the art. Any known or to be known technique for predicting object trajectories based on cuboid geometries can be used herein without limitation. For example, one technique involves predicting that the object is moving on a linear path in the same direction as the heading direction of the cuboid. The present solution is not limited to the particulars of this example.

In 616, a trajectory for the AV is generated using the cuboid's geometry and the predicted object's trajectory. Techniques for determining a vehicle trajectory using a cuboid are well known in the art. Any known or to be known technique for determining a vehicle trajectory using a cuboid can be used herein without limitation. For example, in some scenarios, such a technique involves determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this example. The AV is then caused to follow the trajectory, as shown by 618. In effect, the cuboid can also be said to facilitate the control of autonomous driving operations of the AV. Subsequently, 620 is performed where method 600 ends or other operations are performed.

Figure 8:
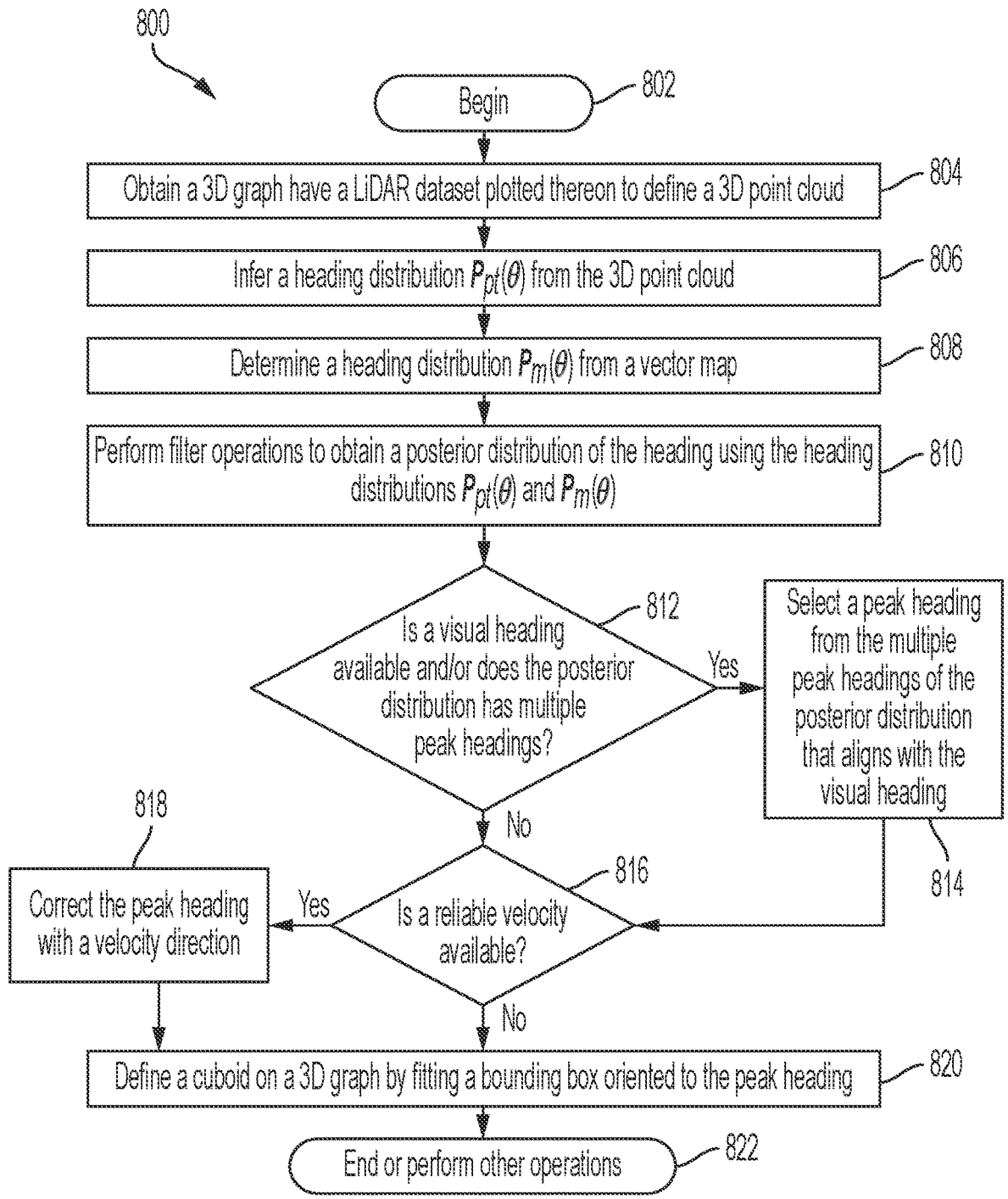
FIG. 8 provides a flow diagram of an illustrative method for operating a vehicle.

Referring now to FIG. 8, there is provided a flow diagram of an illustrative method 800 for defining a cuboid (e.g., cuboid 704 of FIG. 7). Method 800 can be performed in 612 of FIG. 6 to define a cuboid on a 3D graph that encompassed the LiDAR data points in the 3D graph that are associated with the detected object.

An important step in defining the cuboid is to estimate its heading, i.e., the yaw of the object (e.g., vehicle $102_2$ of FIG. 1). Once the heading is determined, a cuboid is fit to the LiDAR dataset (e.g., LiDAR dataset 702 of FIG. 7) either based on a surface model (i.e., the 3D point cloud for a track measured by a LiDAR system) or based on a default size for a typical object if the surface model does not have a sufficient number of points.

Figure 9:
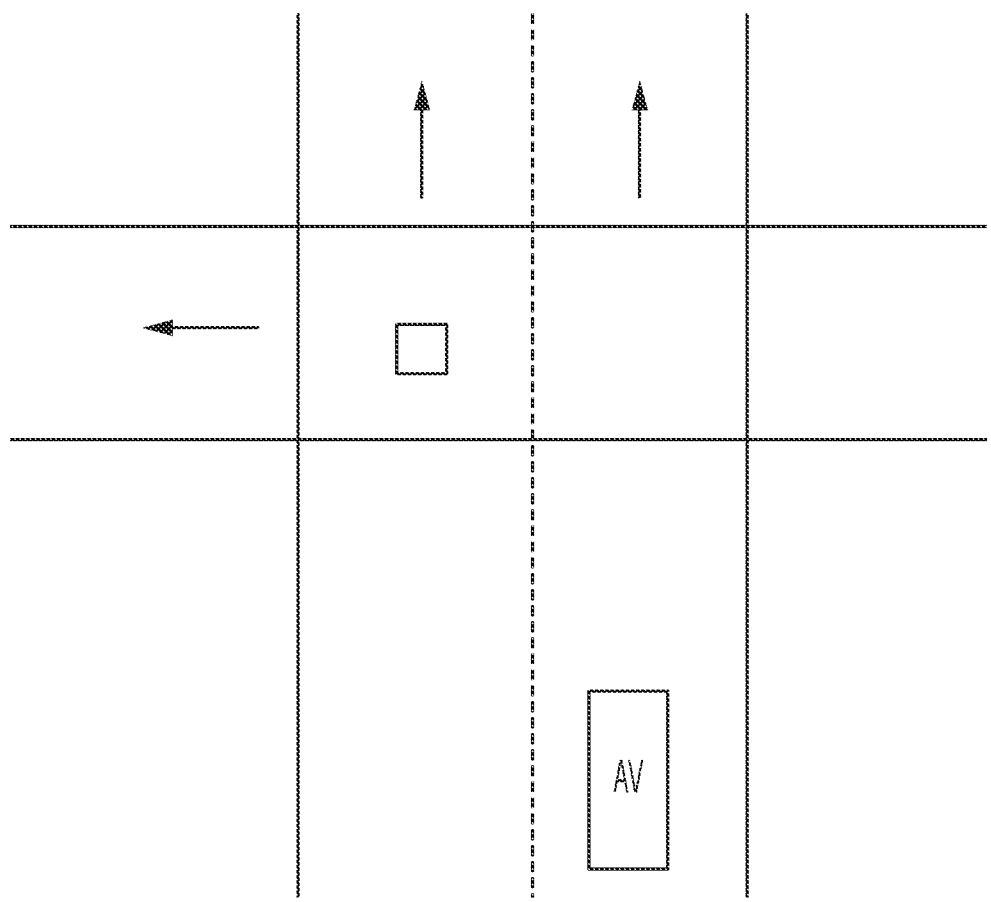
FIG. 9 provides an illustration showing multiple possible yaw directions for an object.

The cuboid heading is estimated using histogram filtering. Histogram filtering is used here because the heading estimate is a multimodal distribution. For example, as shown in FIG. 9, only a measurement of one corner of the object at an intersection is available. The object might face any lane direction among the two lanes that this object is currently in at this moment.

Figure 10:
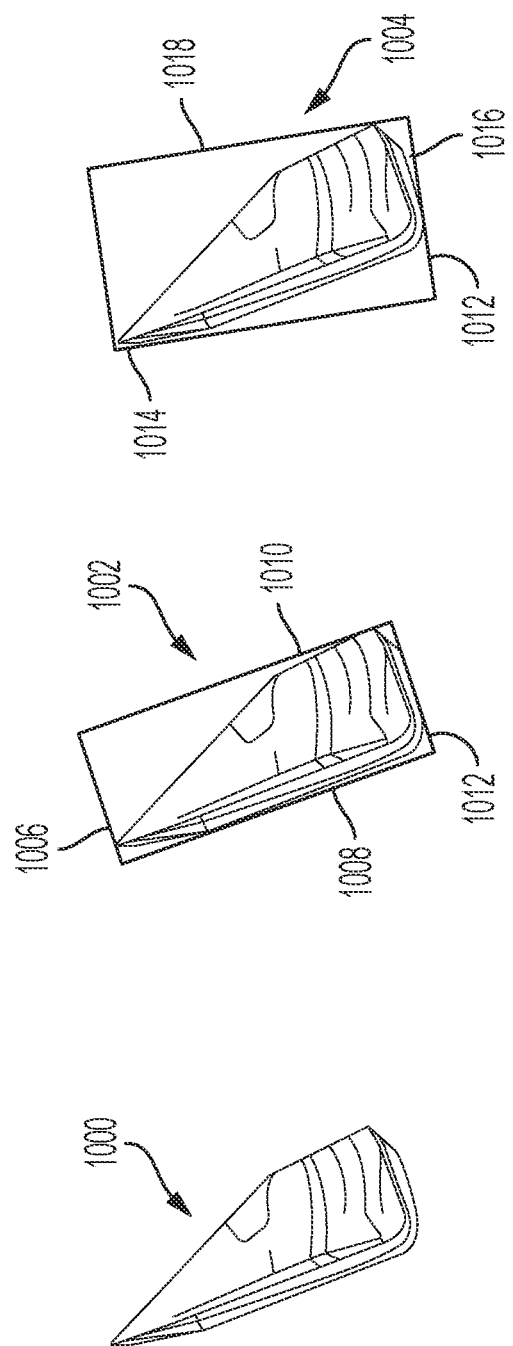
FIG. 10 provides an illustration showing a point cloud and bounding boxes along different yaw directions.

As shown in FIG. 8, method 800 begins with 802 and continues with 804 where a 3D graph is obtained that has a LiDAR dataset plotted thereon to define a 3D point cloud. In 806, a heading distribution for an object (e.g., vehicle $102_2$ of FIG. 1) is inferred from the 3D point cloud. The object may include, but is not limited to, a vehicle. A typical shape (the convex hull) of vehicles is a rectangular-like shape with a heading aligned with a longer edge. The basic observation is that, if a minimal bounding box is fit along all possible heading directions, the bounding boxes with the smallest areas should indicate the most likely heading directions. An illustration of such bounding boxes 1002, 1004 encompassing a point cloud 1000 for an object is provided in FIG. 10.

Figure 11:
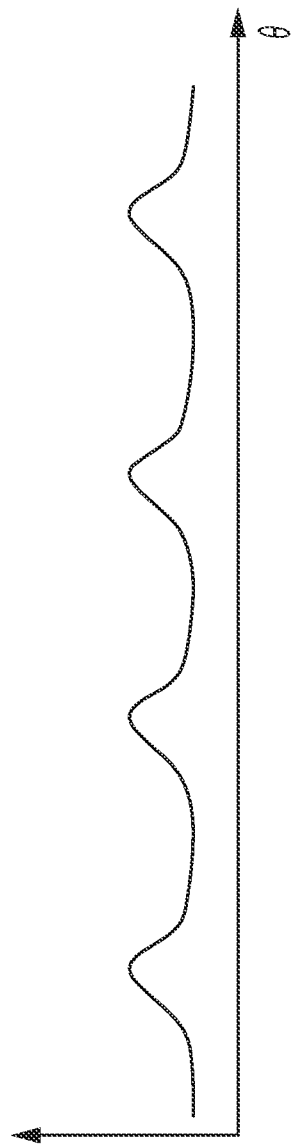
FIG. 11 provides a graph showing a heading distribution based on point cloud measurements.

When fitting a bounding box, the system only uses LiDAR points on convex hulls that are observable from the AV (e.g., vehicle $102_1$ of FIG. 1). Each convex hull is defined by a line completely enclosing a set of points in a plane so that there are no concavities in the line. More specifically, the convex hull is the smallest convex polygon which encloses a set of points such that each point in the set lies within the polygon or on its perimeter. This can remove those LiDAR points that are sampled from an interior of a vehicle, which can affect the heading estimation. The bounding box is referred to herein as a minimal bounding box $B(\theta)$ and its area $Area(B(\theta))$ where $\theta$ is the heading direction or yaw in the vehicle frame. Based on the basic observation, a cost function is defined by the following mathematical equation (1) and the heading distribution is defined by the following mathematical equation (2).

$$C(\theta)=Area(B(\theta)) \tag{1}$$

$$P_{pt}(\theta)=1/\eta*\exp(-C(\theta)) \tag{2}$$

where $\exp(\ )$ is the exponential function and $\eta$ is a normalization constant. Because of the symmetry of the minimal bounding boxes, the heading distribution looks like that shown in FIG. 11. Note that the cost function based on the areas of the bounding box is a very rough indication of the heading. Thus, the cost function is refined to take into account other important information contained in 3D point cloud pertinent to the heading.

Figure 12:
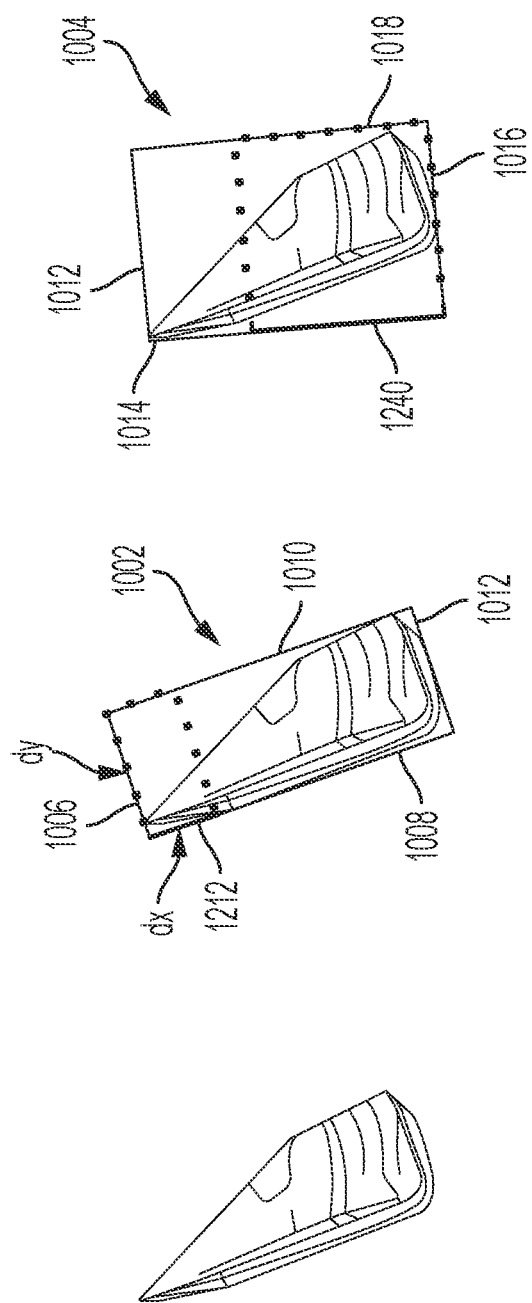
FIG. 12 provides illustrations that are useful for understanding occluded points of an object.

For the minimal bounding boxes, those that touch most of the LiDAR points match the actual vehicle shape better. To achieve this, an additional cost is added based on how well the bounding boxes touch the LiDAR points of the 3D point cloud. First, the system calculates the portion of each visible edge (e.g., edges 1010, 1012, 1016, 1018 of FIG. 10) of each bounding box (e.g., bounding boxes 1002, 1004 of FIG. 10) that does not have any LiDAR points in proximity thereto. An illustration of such portions is provided in FIG. 12. In FIG. 12, assuming edge 1008 of bounding boxes 1002 is an edge visible from the AV, such a portion for edge 1008 is shown by solid line 1212. Similarly, assuming edge 1014 of bounding boxes 1004 is an edge visible to the AV, such portions for edge 1014 are shown by solid line 1240. The UnmatchedArea for bounding box 1002 is dx×dy where is the length of solid line 1212 and dy is the length of edge 1006. Similarly, the UnmatchedArea for bounding box 1004 is dx×dy where dx is the length of solid line 1240, and dv is the length of the edge 1012. The present solution is not limited to the particulars of FIG. 12. With this, the new cost function is defined by the following mathematical equation (3).

$$C(\theta)=Area(B(\theta))+UnmatchedArea(\theta) \tag{3}$$

where $UnmatchedArea(\theta)$ is the area of the bounding box that does not have any LiDAR points that touch the visible edge of the bounding box.

If the system uses the minimal bounding box fitted to all the LiDAR points, then the system effectively only uses the most outer LiDAR points. To leverage interior points, an observation is made that LiDAR points at different elevations exhibit the same pattern. A bounding box is fit at each elevation, and then the costs are added together as shown by the following mathematical equation (4).

$$C(\theta) = \sum_{elevation} (\text{Area}(B(\theta) + UnmatchedArea(\theta))) \quad (4)$$

This way the heading distribution is made to have more weight on the region of yaw where the bounding boxes at different elevations match the LiDAR points better.

Figure 13:
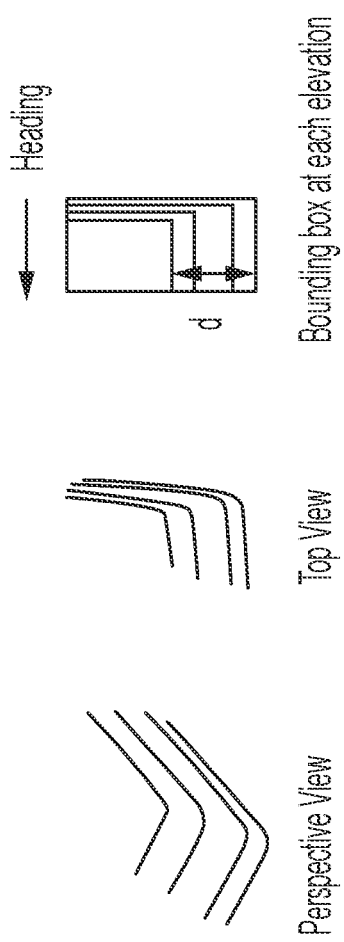
FIG. 13 provides illustration showing bounding boxes at different elevations.

The sizes of the bounding boxes at each elevation are different. Their edges typically align differently along the z-direction (vertically) because of the shape of the vehicle, but the other set of edges do not. This is illustrated in FIG. 13. In order to leverage this observation, the system calculates a distance $d(\theta)$ between the edge of the bounding box at a current elevation to the most outer edge. The square of the distance is then added to the cost function since the cost function has the unit of area. This cost function is defined by the following mathematical equation (5).

$$C(\theta) = \sum_{elevation} (\text{Area}(B(\theta) + UnmatchedArea(\theta) + d(\theta)*d(\theta))) \quad (5)$$

Note that the distance $d(\theta)$ depends on $\theta$, but is calculated in an orthogonal direction. Alternatively, the system can calculate the distance $d(\theta)$ along the same direction as the heading, but deduct the distance $d(\theta)$ from the cost. In this case, the cost function may be negative. The heading distribution $P_{pt}(\theta)$ may then be computed in accordance with the above-provided mathematical equation (2) using the cost function $C(\theta)$ defined by mathematical equation (5).

Referring again to FIG. 8, method 800 continues with 808 where a heading distribution is determined from a vector map. In some scenarios, the object is a vehicle that is in traffic. As such, lane detections provided by the vector map can give a strong clue where the vehicle is heading to because most times the vehicle travels towards the direction of the lane the vehicle is in. This lane direction is used by the system as a prior distribution for the vehicle heading. In other words, if no observations of the vehicle has been obtained, then an assumption is made that the vehicle's heading is pointing to the lane direction.

Figure 14:
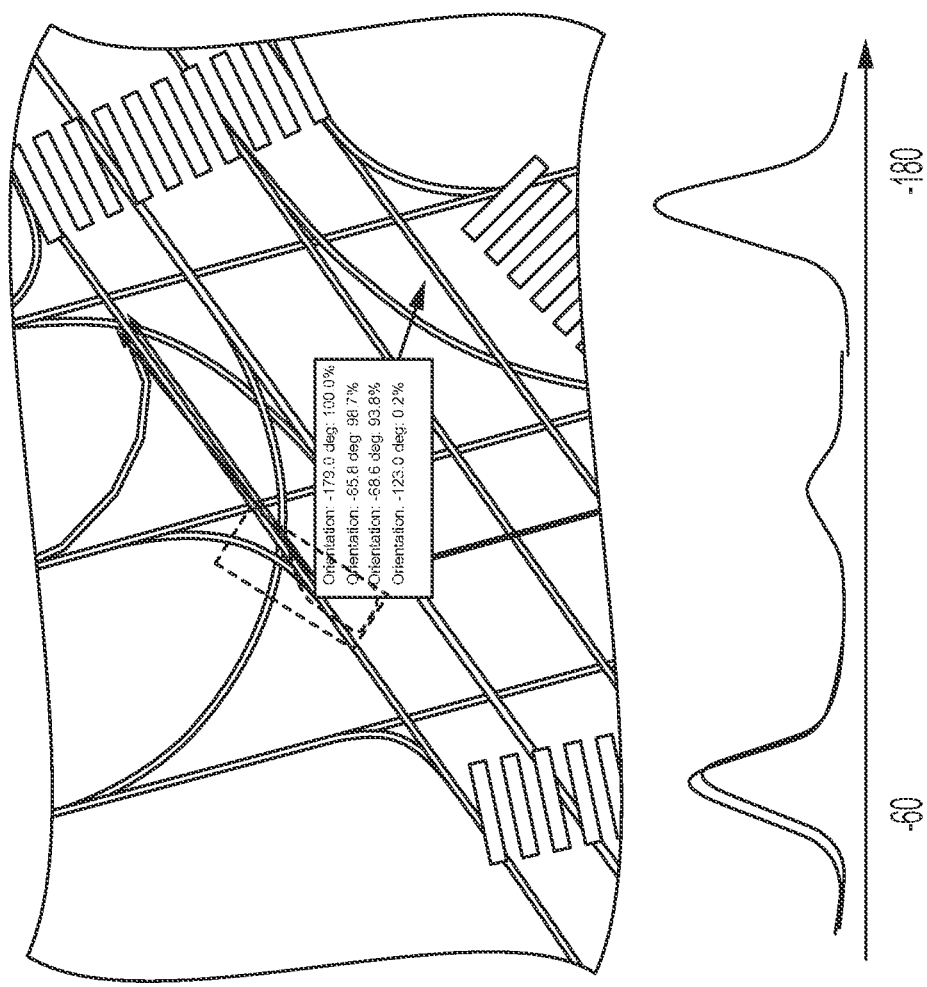
FIG. 14 provides an illustration and a graph that are useful for understanding a heading direction based on lane directions.

The heading distribution introduced from the lane direction is modeled as a Gaussian distribution. Each such Gaussian distribution has a weight which is proportional to the overlap area of the vehicle with the lane geometry. When updating the posterior, the maximum probability among all Gaussian distributions is used to define the heading distribution as shown by the following mathematical equation (6).

$$p_m(\theta) = \max_i(N(\theta:\alpha_i,\sigma_i^2)) \quad (6)$$

where $N()$ is a normal distribution, $\alpha_i$ are the lane directions, and $\sigma_i^2$ are the corresponding variances which are configurable. An illustrative heading distribution based on lane directions is shown in FIG. 14.

Figure 15:
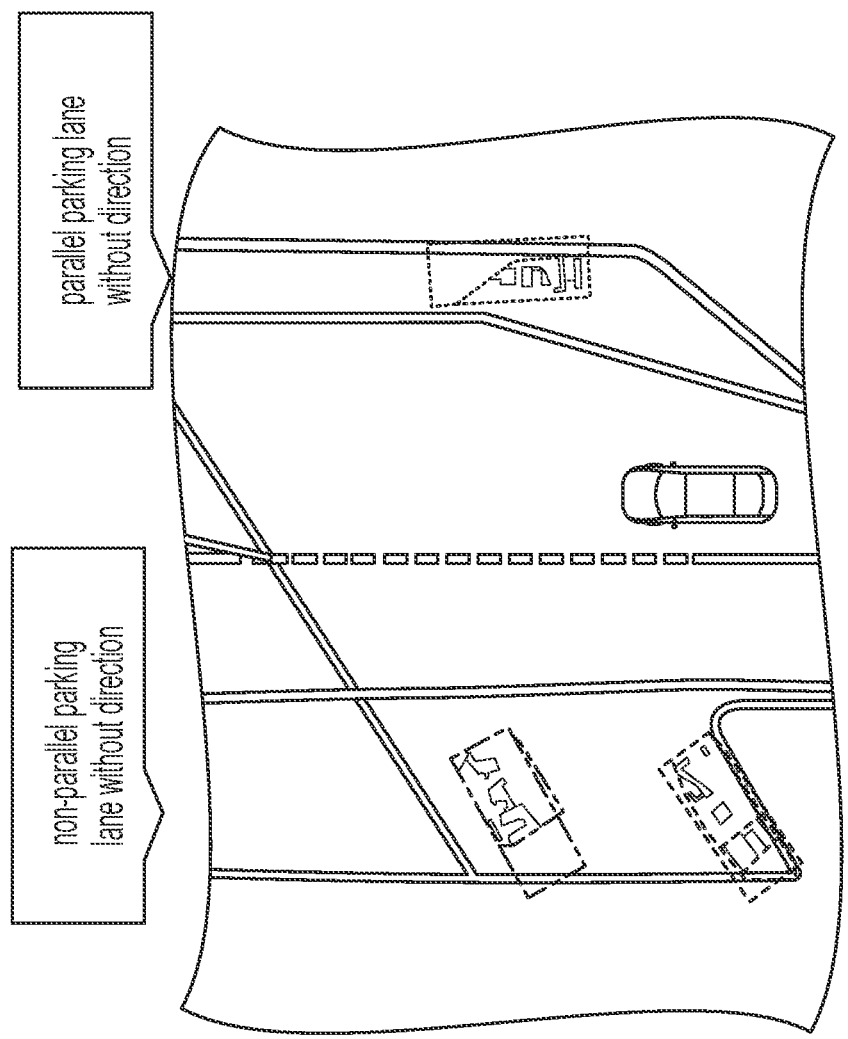
FIG. 15 provides an illustration that shows parking lanes with different widths.
Figure 16:
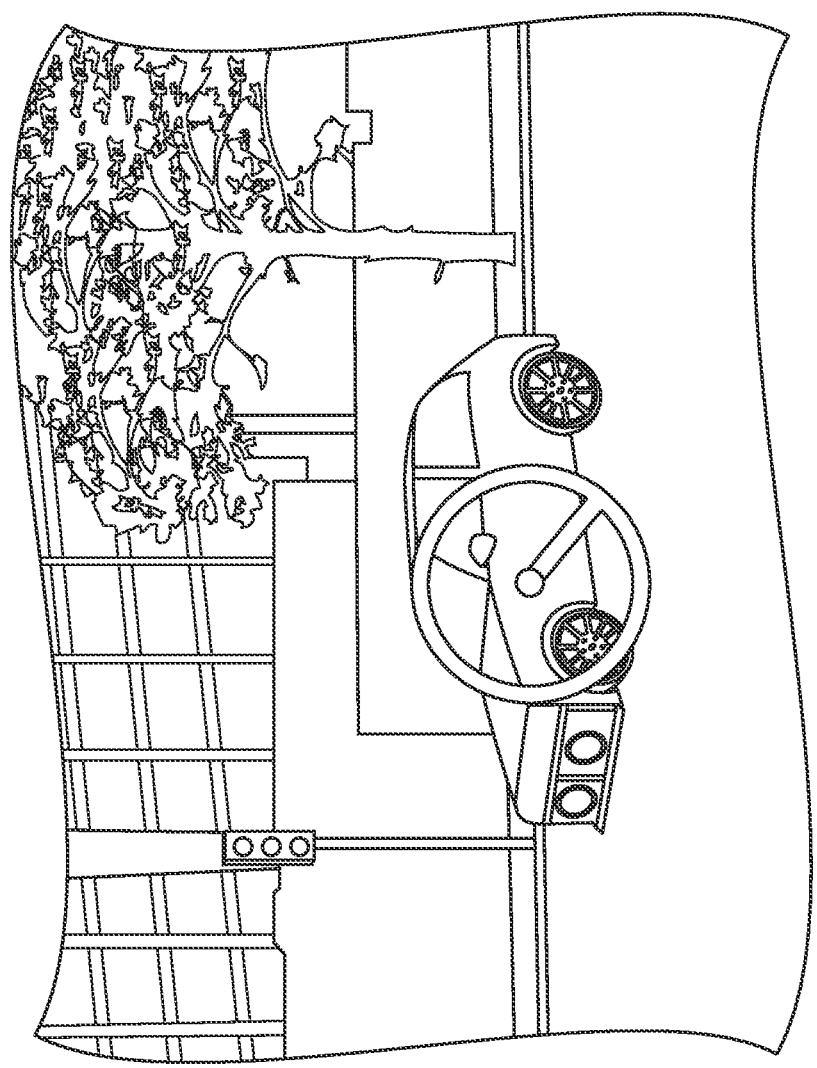
FIG. 16 provides an illustration that is useful for understanding a visual heading for an object.

Notably, some parking lanes in the vector map may not provide a direction. There are two kinds of such parking lanes as shown in FIG. 15: wide lanes that allow non-parallel parking; and narrow lanes that allow parallel-parking. The lanes widths provide a strong indication on the kind of parking lanes. If a lane is a narrow parking lane, then the system finds a neighbor lane direction and uses the neighbor lane direction for this lane. Otherwise, an assumption is made that the lane direction is perpendicular to the direction of the neighbor lane.

Referring again to FIG. 8, method 800 continues with 810 where filter operations are performed to obtain a posterior distribution of the heading using the heading distributions $P_{pt}(\theta)$ and $P_m(\theta)$. The filter operations can include applying a Bayes filter or histogram filter to obtain the posterior distribution of heading. For reference, a basic Bayes filter is defined by the following mathematical equation (7).

$$p(x|z) = \frac{p(z|x)p(x)}{\eta} \quad (7)$$

where z represents a new measurement and x represents a state to be estimated. In the present case, $p(x)$ is a heading distribution based on the vector map $P_m$, and $p(z/x)$ is the heading distribution based on the point cloud $P_{pt}$. The discretization version of the basic Bayes filter is as follows. Notably, a resolution of one degree is used here. Different resolutions can be used depending on how accurate the result is to be.

```
for (yaw = 0; yaw < 360; yaw++)
{
    P_posterior(yaw) = P_pt(yaw) * P_m(yaw)
}
```

Notably, the implementation can exploit the symmetry and thus avoid repeated computation.

When a vehicle is relatively close to the AV and is not occluded (thus a relatively complete view of the vehicle is captured), a greater weight is given to the heading distribution that was determined based on the 3D point cloud as compared to the weight given to the heading distribution that was determined based the vector map. This is because what really determines the heading is the object's geometry which is represented by the 3D point cloud. A scale factor $sf(d, n_{pt})$ is introduced that depends on the distance d of the vehicle to the AV and the number of points $n_{pt}$ in the surface model. The scale factor $sf(d, n_{pt})$ is smaller when the object is relatively far away from the AV with fewer LiDAR points in the 3D point cloud. The $sf(d, n_{pt})$ controls the variance of the Gaussian distribution of the lane direction: when $sf(d, n_{pt})$ is small, the variance is small and thus the Gaussian distribution is narrow while when $sf(d, n_{pt})$ is large, the Gaussian distribution is flat and thus more weight is given to the distribution based on point cloud. Accordingly, the discretization version of the basic Bayes filter is modified as follows.

```
for (yaw = 0; yaw < 360; yaw++)
{
    P_posterior(yaw) = P_pt(yaw) * P_m(yaw: sf(d, npt))
}
```

Figure 17:
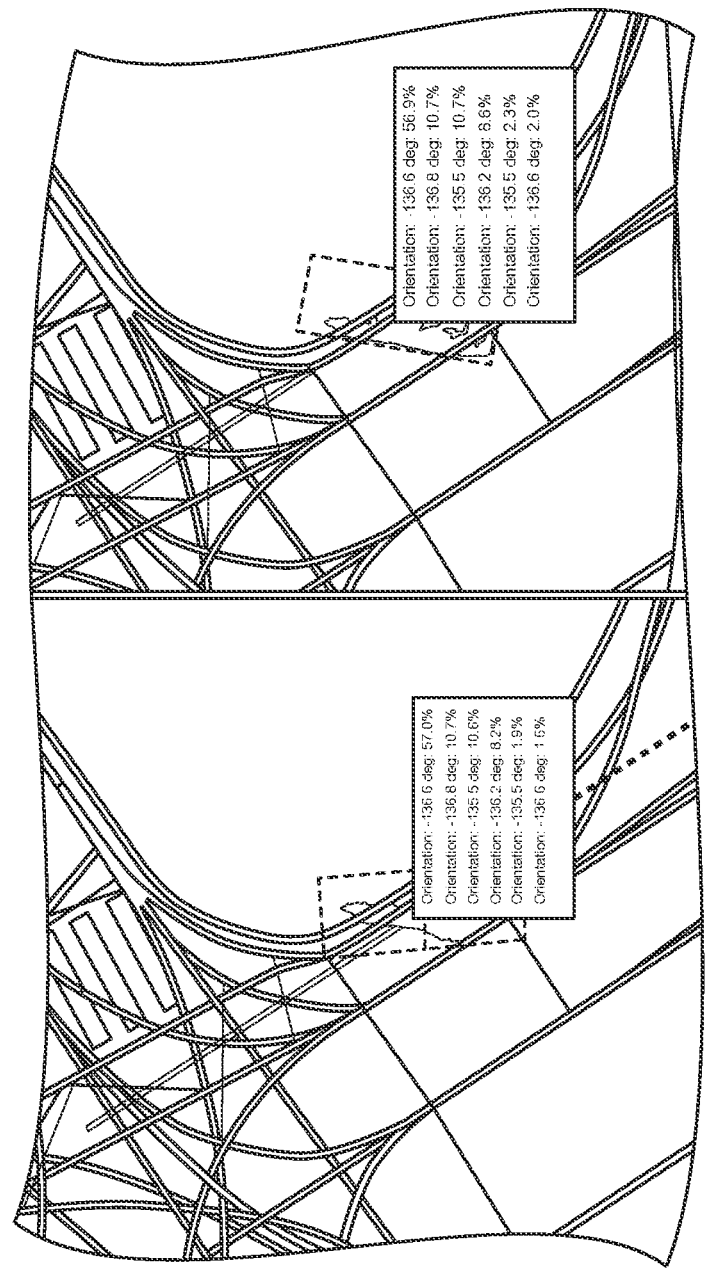
FIG. 17 provides illustrative results from performing a Bayes filter including a scale factor $sf(d, n_{pt})$ for adaptive weighting.

FIG. 17 shows illustrative results from performing the Bayes filter including the scale factor $sf(d, n_{pt})$ for adaptive weighting. Estimated cuboids are shown on the left with adaptive weighting, and estimated cuboids are shown in the right without adaptive weighting.

Referring again to FIG. 8, a decision is made in 812 as to whether a visual heading is available. The visual heading may be determined from images captured by camera(s) (e.g., camera(s) 262 of FIG. 2) of the AV. More particularly, image processing is performed to detect a front of the object and a back of the object. The visual heading is then defined as pointing in a direction from the object's back to front.

If a visual heading is available and the posterior distribution has two peak headings that are opposite each other [814:YES], then method 800 continues with 816 where a heading is selected from the posterior distributions that aligns with the visual heading. Thereafter, method 800 continues to 818, which will be described below.

In contrast, if the visual heading is not available [814: NO], then method 800 continues with 816 which involves determining whether a reliable velocity of the object is available. The velocity direction provides a strong indication where the heading should point. If a reliable velocity of the object is available [816:YES], then the system tests whether the heading and velocity are within ninety degrees of each other. If they are, then the heading is flipped one hundred eighty degrees in 818. If a reliable velocity of the object is not available [816:NO], then the heading is not corrected with the velocity direction.

Figure 18:
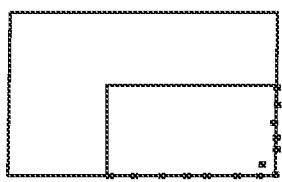
FIG. 18 provides an illustration that is useful for understanding how a size of a cuboid is determined.
Figure 18:
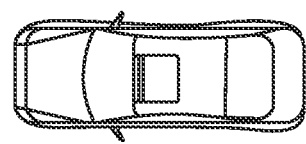
Figure 18:
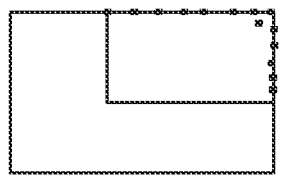

Next in 820, a cuboid is defined on the 3D graph by fitting a bounding box oriented in the heading direction. Since the point cloud measurement usually only captures a portion of an object, the bounding box is not tightly fit to the point cloud. In this regard, a default size for the bounding box is used that represents the possible minimal size of a vehicle. If the minimal bounding box is smaller than the default size, the bounding box size is enlarged based on where the bounding box is relative to the AV (as shown in FIG. 18). Subsequently, 822 is performed where method 800 ends or other operations are performed.

Notably, method 800 was discussed herein in relation to how to estimate a cuboid based on a single measurement. The present solution is not limited in this regard. It is straightforward to integrate the present solution to a recursive filtering framework.

Figure 19:
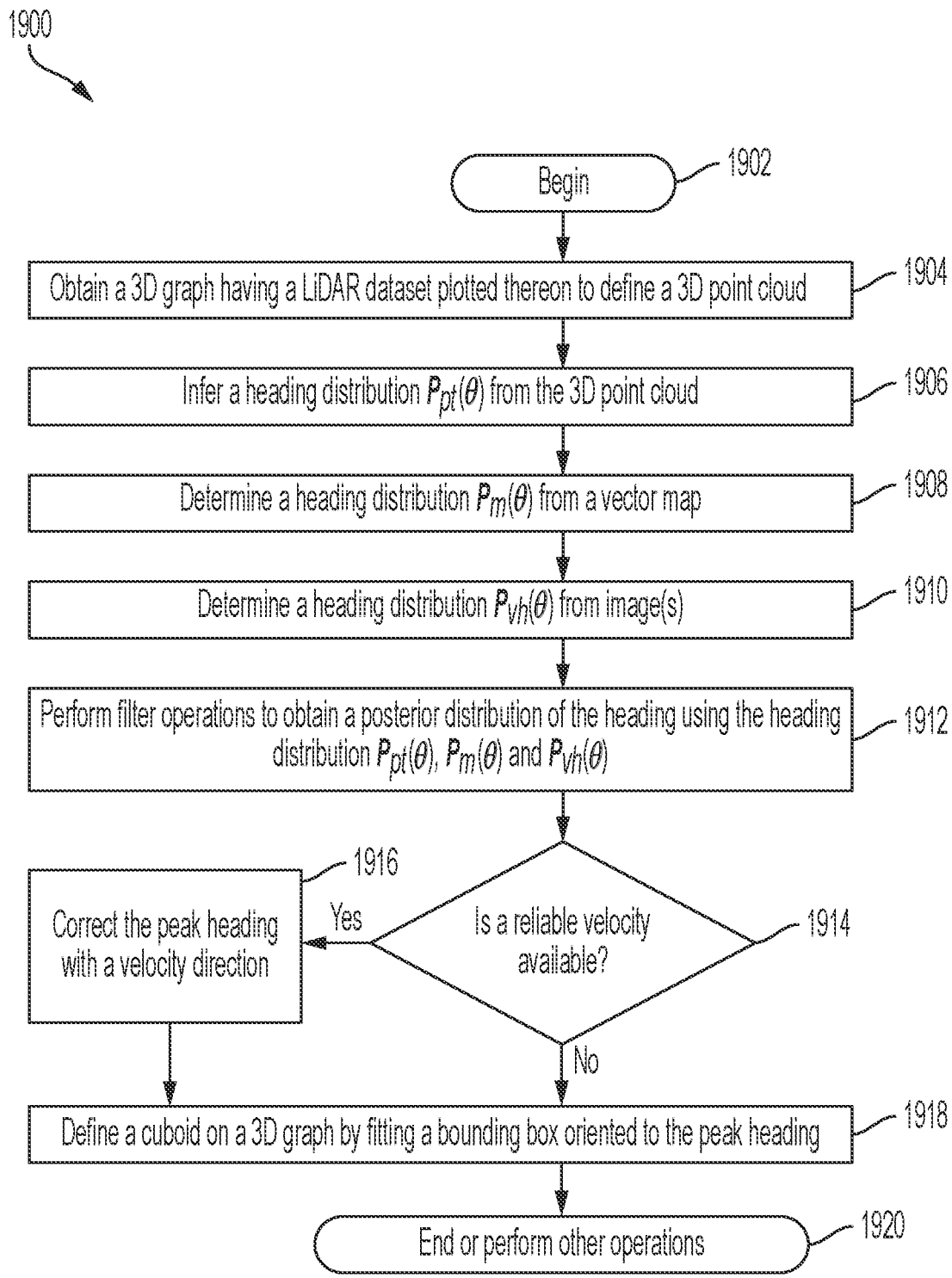
FIG. 19 provides a flow diagram of another illustrative method for operating a vehicle.

Another illustrative method 1900 for defining a cuboid (e.g., cuboid 704 of FIG. 7) is provided in FIG. 19. Method 1900 can be performed in 612 of FIG. 6 to defining a cuboid on a 3D graph that encompassed the LiDAR data points in the 3D graph that are associated with the detected object.

As shown in FIG. 19, method 1900 begins with 1902 and continues with 1904 where a 3D graph is obtained that has a LiDAR dataset plotted thereon to define a 3D point cloud. In 1906, a heading distribution $P_{pt}(\theta)$ for an object (e.g., vehicle $102_2$ of FIG. 1) is inferred from the 3D point cloud in accordance with mathematical equations (2) and (5) provided above. Next in 1908, a heading distribution $P_m(\theta)$ is determined from a vector map in accordance with mathematical equation (6) provided above. Another heading distribution $P_{vh}(\theta)$ is determined from images(s) in accordance with any known or to be known method to calculate or estimate such distributions (e.g., a machine learning based method).

In 1912, filter operations are performed to obtain a posterior distribution of the heading using the heading distributions $P_{pt}(\theta)$, $P_m(\theta)$ and $P_{vh}(\theta)$. The filter operations can include applying a Bayes filter or histogram filter to obtain the posterior distribution of heading. An illustrative discretization version of the basic Bayes filter is as follows. Notably, a resolution of one degree is used here. Different resolutions can be used depending on how accurate the result is to be.

```
for (yaw = 0; yaw < 360; yaw++)
{
    P_posterior(yaw) = P_pt(yaw) * P_m(yaw) * P_vh(yaw)
}
```

Notably, the implementation can exploit the symmetry and thus avoid repeated computation.

When a object is relatively close to the AV and is not occluded (thus a relatively complete view of the vehicle is captured), a greater weight is given to the heading distribution that was determined based on the 3D point cloud as compared to the weight given to the heading distribution that was determined based the vector map. This is because what really determines the heading is the object's geometry which is represented by the 3D point cloud. A scale factor $sf(d, n_{pt})$ is introduced that depends on the distance d of the vehicle to the AV and the number of points $n_{pt}$ in the surface model. The scale factor $sf(d, n_{pt})$ is smaller when the object is relatively far away from the AV with fewer LiDAR points in the 3D point cloud. The $sf(d, n_{pt})$ controls the variance of the Gaussian distribution of the lane direction: when $sf(d, n_{pt})$ is small, the variance is small and thus the Gaussian distribution is narrow while when $sf(d, n_{pt})$ is large, the Gaussian distribution is flat. Accordingly, the discretization version of the basic Bayes filter is modified as follows.

```
for (yaw = 0; yaw < 360; yaw++)
{
    P_posterior(yaw) = P_pt(yaw) * P_m(yaw: sf(d, npt)) * P_vh(yaw)
}
```

Referring again to FIG. 19, a decision is made in 1914 as to whether a reliable velocity of the object is available. The velocity direction provides a strong indication where the heading should point. If a reliable velocity of the object is available [1914:YES], then the system tests whether the heading and velocity are within ninety degrees of each other. If they are, then the heading is flipped one hundred eighty degrees in 1916. If a reliable velocity of the object is not available [1914:NO], then the heading is not corrected with the velocity direction.

Next in 1918, a cuboid is defined on the 3D graph by fitting a bounding box oriented in the heading direction. Subsequently, 1920 is performed where method 1900 ends or other operations are performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a robotic system, comprising:
    inferring, by a computing device, a first heading distribution for the object from a 3D point cloud;
    obtaining, by the computing device, a second heading distribution from a vector map;
    obtaining, by the computing device, a posterior distribution of a heading using the first and second heading distributions;
    defining, by the computing device, a cuboid on a 3D graph using the posterior distribution; and using the cuboid to facilitate driving-related operations of a robotic system.

2. The method according to claim 1, wherein the first heading distribution is inferred based on at least one of a minimal bounding box, an area of the minimal bounding box, a heading direction or yaw in a frame, an area of the minimal bounding box that does not have any LiDAR points, and a distance between an edge of a bounding box at a current elevation to a most outer edge.

3. The method according to claim 1, wherein the second heading distribution is obtained based on lane directions.

4. The method according to claim 1, wherein the posterior distribution is obtained by performing Bayes filter operations.

5. The method according to claim 1, wherein the defining the cuboid on the 3D graph comprises selecting a peak heading from a plurality of peak headings contained in the posterior distribution that is aligned with a visual heading of the object.

6. The method according to claim 1, wherein the defining the cuboid on the 3D graph comprises selecting a peak heading from the posterior distribution of the heading.

7. The method according to claim 6, wherein the defining the cuboid on the 3D graph further comprises flipping the peak heading by one hundred eighty degrees when a determination is made that the peak heading and velocity of the object are within ninety degrees of each other.

8. The method according to claim 7, wherein the defining the cuboid on the 3D graph further comprises fitting a bounding box to the 3D point cloud that is orientated to the peak heading.

9. A system, comprising:
a processor;
a non-transitory computer-readable storage medium comprising programming instructions that are configured to cause the processor to implement a method for operating a robotic system, wherein the programming instructions comprise instructions to:
infer a first heading distribution for the object from a 3D point cloud;
obtain a second heading distribution from a vector map;
obtain a posterior distribution of a heading using the first and second heading distributions;
define a cuboid on a 3D graph using the posterior distribution; and
use the cuboid to facilitate driving-related operations of a robotic system.

10. The system according to claim 9, wherein the first heading distribution is inferred based on at least one of a minimal bounding box, an area of the minimal bounding box, a heading direction or yaw in a frame, an area of the minimal bounding box that does not have any LiDAR points, and a distance between an edge of a bounding box at a current elevation to a most outer edge.

11. The system according to claim 9, wherein the second heading distribution is obtained based on lane directions.

12. The system according to claim 9, wherein the posterior distribution is obtained by performing Bayes filter operations.

13. The system according to claim 9, wherein the cuboid is defined on the 3D graph by selecting a peak heading from a plurality of peak headings contained in the posterior distribution that is aligned with a visual heading of the object.

14. The system according to claim 9, wherein the cuboid is defined on the 3D graph by selecting a peak heading from the posterior distribution of the heading.

15. The system according to claim 14, wherein the cuboid is defined on the 3D graph by further flipping the peak heading by one hundred eighty degrees when a determination is made that the peak heading and velocity of the object are within ninety degrees of each other.

16. The system according to claim 14, wherein the cuboid is defined on the 3D graph by further fitting a bounding box to the 3D point cloud that is orientated to the peak heading.

17. The non-transitory computer-readable medium of claim 16, wherein the defining the cuboid on the 3D graph comprises selecting a peak heading from a plurality of peak headings contained in the posterior distribution that is aligned with a visual heading of the object.

18. The non-transitory computer-readable medium of claim 16, wherein the defining the cuboid on the 3D graph comprises selecting a peak heading from the posterior distribution of the heading.

19. The non-transitory computer-readable medium of claim 18, wherein the defining the cuboid on the 3D graph further comprises flipping the peak heading by one hundred eighty degrees when a determination is made that the peak heading and velocity of the object are within ninety degrees of each other.

20. A non-transitory computer-readable medium that stores instructions that, when executed by at least one computing device, will cause the at least one computing device to perform operations comprising:
inferring a first heading distribution for the object from a 3D point cloud;
obtaining a second heading distribution from a vector map;
obtaining a posterior distribution of a heading using the first and second heading distributions;
defining a cuboid on a 3D graph using the posterior distribution; and
using the cuboid to facilitate driving-related operations of a robotic system.

* * * * *